United States Patent [19]

Cerutti

[11] Patent Number: 4,954,139
[45] Date of Patent: Sep. 4, 1990

[54] METHOD FOR PRODUCING POLYCRYSTALLINE COMPACT TOOL BLANKS WITH FLAT CARBIDE SUPPORT/DIAMOND OR CBN INTERFACES

[75] Inventor: David B. Cerutti, Worthington, Ohio

[73] Assignee: The General Electric Company, Worthington, Ohio

[21] Appl. No.: 331,928

[22] Filed: Mar. 31, 1989

[51] Int. Cl.$^5$ .............................................. B24D 3/00
[52] U.S. Cl. ........................................ 51/293; 51/309
[58] Field of Search ................................. 51/293, 309

[56] References Cited

U.S. PATENT DOCUMENTS

| | | | |
|---|---|---|---|
| 3,141,746 | 7/1964 | De Lai | 51/307 |
| 3,743,489 | 7/1973 | Wentorf, Jr. et al. | 51/309 |
| 3,745,623 | 7/1973 | Wentorf, Jr. et al. | 51/307 |
| 3,767,371 | 10/1973 | Wentorf, Jr. et al. | 51/309 |
| 4,260,397 | 4/1981 | Bovenkerk | 51/309 |
| 4,268,276 | 5/1981 | Bovenkerk | 51/309 |
| 4,311,490 | 1/1982 | Bovenkerk et al. | 51/309 |
| 4,440,573 | 4/1984 | Ishizuka | 51/309 |
| 4,802,895 | 2/1989 | Burnand | 51/309 |

Primary Examiner—William R. Dixon, Jr.
Assistant Examiner—Willie J. Thompson
Attorney, Agent, or Firm—Mueller and Smith

[57] ABSTRACT

The present invention relates to a method for making a supported PCD or CBN compact comprising placing in an enclosure a cup assembly having a mass of diamond or CBN particles having a surface and the mass of cemented metal carbide having a surface, and optionally a catalyst for diamond (or optionally, CBN) recrystallization, said surfaces being in adjacency to form an interface. The enclosure then is subjected to a high pressure/high temperature process which results in diamond or CBN compacts preferably characterized by diamond-to-diamond or CBN-to-CBN bonding joined to a cemented carbide support at their respective surfaces. The supported compacts are recovered from the enclosure and cup assemblies and finished. The finished supported compacts in the enclosure exhibit non-planar bonded interface resulting in PCD or CBN compacts of substantially non-uniform thickness. The improvement in process of the present invention comprises said carbide mass surface being the mirror image of the finished PCD or CBN non-planar interface for making a finished supported compact of substantially uniform diamond or CBN compact thickness. Preferably, at least two compacts are produced in the process and the catalyst for diamond recrystallization is provided from the cemented metal carbide mass.

23 Claims, 3 Drawing Sheets

METHOD FOR PRODUCING POLYCRYSTALLINE COMPACT TOOL BLANKS WITH FLAT CARBIDE SUPPORT/DIAMOND OR CBN INTERFACES

BACKGROUND OF THE INVENTION

The present invention relates to polycrystalline diamond (PCD) or cubic boron nitride (CBN) compacts made by a high pressure/high temperature process (HP/HT) and more particularly to such compact in supported configuration having substantially flat support interfaces.

A compact is a sintered polycrystalline mass of abrasive particles (e.g. diamond) bonded together to form an integral, tough, coherent, high strength mass. A composite compact is a compact bonded to a substrate material, such as a cemented metal carbide (e.g. cobalt cemented tungsten carbide). The metal bonded carbide mass generally is selected from the group consisting of tungsten, titanium, tantalum carbides and mixtures thereof with metal bonding material therein normally being present in a quantity from about 6 to 25 weight percent and selected from the group consisting of cobalt, nickel, iron and mixtures thereof. Other metal carbides can be used.

Compacts or composite compacts may be used as blanks for cutting tools, drill bits, dressing tools, and wear parts. Compacts made in a cylindrical configuration have been used to make wire drawing dies (see U.S. Pat. No. 3,381,428).

One method for manufacturing diamond compacts involves the steps of:

A. placing within a protective shield metal enclosure which is disposed within the reaction cell of an HP/HT apparatus;
  (1) a mass of diamond crystals;
  (2) a mass of catalyst metal or alloy containing catalyst metal in contact with the mass of diamond crystals; and
  (3) optionally, a mass of metal cemented carbide; and
B. subjecting the contents of the cell to conditions of temperature, pressure and time (typically at least 50 kbar, at least 1300° C. and 3-120 minutes) sufficient to give bonding between adjacent crystal grains.

The mass of catalyst metal could be in the form of a disc of one of the well known catalyst or an alloy containing at least one catalyst metal for diamond crystallization. Under the HP/HT condition, a wave of liquid metal advances through the dense diamond (or CBN material as described below), and the catalyst metal (in liquid form) makes itself available as a catalyst or solvent for recrystallization or crystal intergrowth. The terms catalyst and catalyst/solvent are used interchangeably. This process is sometimes known as the sweep-through method, i.e. the catalyst sweeps (or advances or diffuses) through the crystalline mass.

The relative shapes of the abrasive mass and catalyst can be varied. For example, the mass of diamond can be cylindrical, and the catalyst can be an annular shape surrounding the cylinder of abrasive crystals or a disc on top or below the diamond mass.

The source of catalyst may also be cemented metal carbide or carbide molding powder (which may be cold pressed to shape) wherein the cementing agent is a catalyst or solvent for diamond recrystallization or growth.

The catalyst is generally selected from cobalt, nickel and iron, but can be selected from any of the known catalysts which also include ruthenium, rhodium, palladium, platinum, chromium, manganese, tantalum or mixtures or alloys of catalysts. Catalyst may be mixed with the abrasive crystals in addition to or instead of being a separate mass adjacent to the abrasive crystals.

High temperature and high pressure in the diamond stable region are applied for a time sufficient to bond or sinter the diamond crystals together. The diamond stable region is the range of pressure temperature conditions under which diamond is thermodynamically stable. On a pressure-temperature phase diagram, it is the high pressure side, above the equilibrium line between diamond and graphite. The resulting compact is characterized particularly by diamond-to-diamond bonding, i.e., bonding between adjacent grains whereby there are parts of the crystal lattice which are shared between neighboring crystal grains (resulting from recrystallization at HP/HT conditions). The diamond concentration preferably is at least 70 volume percent of the diamond mass (i.e. excluding any substrate mass). Methods for making diamond compacts are detailed in U.S. Pat. Nos. 3,141,746; 3,745,623; 3,609,818; 3,831,428; and 3,850,591 (all of which are incorporated herein by reference).

Cubic boron nitride compacts are manufactured in a similar manner to that just described for diamond. However, in making a CBN compact by the sweep-through method, the metal swept through into the CBN crystal mass may or may not be a catalyst or solvent for CBN recrystallization. Thus, a mass of polycrystalline CBN can be bonded to a cobalt cemented tungsten carbide substrate by sweep through of the cobalt ingredient into the interstices of the CBN mass under HP/HT conditions, even though cobalt is not a catalyst for CBN. This interstitial cobalt binds the polycrystalline CBN to the cemented tungsten carbide substrate. Nevertheless, the term catalyst will be used to described the bonding or sintering metal swept into a CBN particle mass for the sake of convenience.

The HP/HT sintering process for CBN is carried out in the CBN stable region which is in the range of pressure and temperature conditions under which CBN is thermodynamically stable. CBN concentration is preferably at least 70 volume percent of the CBN mass. Methods for making CBN compacts are detailed in U.S. Pat. Nos. 3,233,988; 3,743,489; and 3,767,371, which are incorporated herein by reference. Crystal intergrowth or crystal-to-crystal bonding between neighboring CBN grains (as described for diamond compacts) is believed to be present.

Another form of a polycrystalline compact, which may or may not contain inter-crystal bonding, comprises a mass of diamond or CBN particles containing a second phase comprising a metal or alloy, a ceramic material, or mixtures thereof, which additional material or phase functions as a bonding agent for the abrasive particles. Polycrystalline diamond and polycrystalline CBN compacts containing a cemented carbide material is an example of such a conjoint polycrystalline abrasive mass or compact.

Fine diamond feed material has always been more difficult to sinter by the sweep-through method. Generally, sintering becomes increasingly difficult as the feed material particle size decreases. Smaller sizes of diamond feed materials (particles having a nominal largest dimension of 4-8 microns or less) have been a problem for some time because of their large surface area and small size causes more difficulties when cleaning, handling or loading the fine powder into a reaction cell. However, it is also known that as the grain size of diamond compacts decreases, transverse rupture strength increases, thus giving compacts made with smaller particles an advantage. Another advantage is the compact's finer cutting edge which may result in less workpiece damage. Under the high pressures (e.g. 50 kbar and greater) applied during the HP/HT process, such fine abrasive crystals compact resulting in a rather high packing density and a very fine pore structure. The resulting diamond mass, therefore, is dense and offers resistance to the percolation or sweep of catalyst metal through the interstices.

It is common in commercial production of supported compacts to make several in the same enclosure disposed within the reaction cell of the HP/HT apparatus. After the supported compacts are recovered from the HP/HT apparatus, they typically are subjected to finishing operations which include grinding any adhering shield metal from the outer surfaces of the compacts and often additional grinding in order to produce, for example, a cylindrical compact having a diamond or CBN table thickness and/or carbide support thickness that falls within product specifications established by the manufacturer. Especially with respect to the PCD and CBN compacts, a substantially uniform abrasive layer thickness is desirable since the blanks often are cut by the manufacturer or user into a variety of configurations (e.g. pie-shaped wedges) and the abrasive table or layer should be substantially uniform on each of such final products. The supported compact blanks recovered from the HP/HT apparatus already have been exposed to high temperature followed by cooling to about room temperature. During finishing operations, the temperature of the compact also can be elevated due to the grinding operations, cutting operations (e.g. using laser or electrodischarge machining techniques). Further, the blanks or products cut therefrom often will be mounted within tools utilizing a variety of braze techniques which further subjects the blanks or products therefrom to elevated temperature. At each of these stages of heating, the carbide support will expand to a much greater extent than will the PCD or CBN abrasive layers bonded thereto. Upon cooling, residual stresses in the pre-heated compacts naturally will be relieved. Such relief often is manifested by a compact having a non-planar bonded surface between the abrasive layer and the carbide support, thus resulting in compacts of substantially non-uniform thickness, such as is illustrated at FIG. 1 or FIG. 2 (which will be described in detail below). There is a need in the art, then, for producing compact blanks and products made therefrom that have a substantially planar interface for providing finished supported compacts of substantially uniform PCD or CBN compact thickness.

BROAD STATEMENT OF THE INVENTION

The present invention relates to a method for making a supported PCD or CBN compact comprising placing in an enclosure a cup assembly having a mass of diamond or CBN particles having a surface and the mass of cemented metal carbide having a surface, and preferably a catalyst for diamond (or optionally, CBN) recrystallization, said surfaces being in adjacency and forming an interface. The enclosure then is subjected to a high pressure/high temperature process which results in diamond or CBN compacts characterized by diamond-to-diamond or CBN-to-CBN bonding joined to a cemented carbide support at their respective surfaces. Alternatively, a polycrystalline compact characterized by crystals joined by a metal, an alloy, a cemented carbide or other ceramic material, is formed. The supported compact is recovered from the enclosure and cup assembly and finished. The finished supported compact exhibits a non-planar bonded interface resulting in PCD or CBN compacts of substantially non-uniform thickness. The improvement in process of the present invention comprises said carbide mass surface being the near-mirror image of the finished PCD or CBN non-planar interface for making a finished supported compact of desired (e.g. substantially uniform) diamond or CBN compact thickness and configuration. Preferably, at least two compacts are produced in the process and a catalyst for diamond recrystallization is provided from the cemented metal carbide mass.

Advantages of the present invention include the ability to produce finished PCD or CBN compacts that exhibit substantially uniform (or other desired configuration) abrasive layer thickness, thus resulting in higher part yields. Another advantage is the ability to reliably and reproducably manufacture such uniform abrasive layer thick supported compacts on a commercial scale. Yet another advantage is the ability to provide such uniform compact thickness at various stages during the processing of the recovered compact blanks including brazing operations of the blanks or parts in machine tools. These and other advantages will be readily apparent to those skilled in the art based upon the disclosure contained herein.

The drawings will be described in detail in connection with the Detailed Description of the Invention which follows.

DETAILED DESCRIPTION OF THE INVENTION

Figure 1:
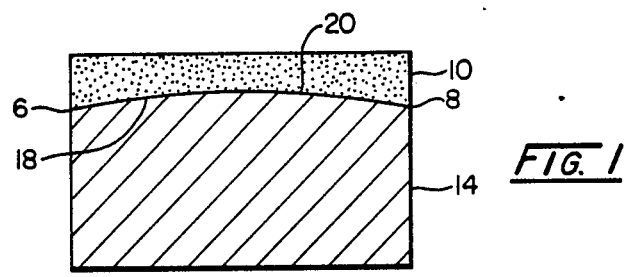
FIGS. 1 and 2 illustrate either prior supported PCD or CBN compacts that exhibit non-planar bonded surfaces; or the inventive carbide mass surface being the mirror image of the finished compact exhibiting such non-planar surface wherein such carbide mass surface is curvilinear.
Figure 2:
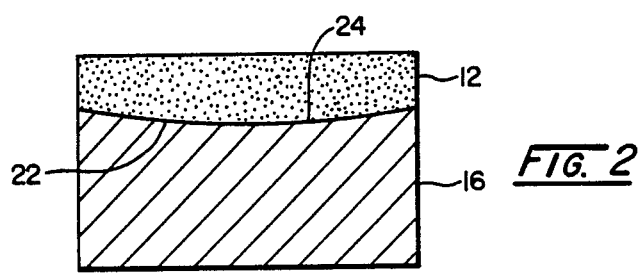

In FIGS. 1 and 2, PCD or CBN compacts 10 and 12 are seen to be bonded to metal cemented carbide supports 14 and 16, respectively. In FIG. 1, abrasive compact surface 18 of compact 10 is seen to be bonded to carbide surface 20 of carbide support 14 to form interface 18/20. Similarly, surface 22 of abrasive compact 12 is seen bonded to surface 24 of support 16 to form interface 22/24 in FIG. 2. It will be observed that compacts 10 and 12 exhibit non-planar bonded surfaces resulting in abrasive layers of substantially non-uniform thickness. The supported compacts depicted at FIGS. 1 and 2 both have been seen in cutting blanks. Regardless of which configuration results from the process, it will be observed that a non-uniform abrasive layer has been produced. Even if the blank recovered from the HP/HT apparatus exhibits a substantially planar interface, finishing operations which include attachment operations, e.g. brazing, can result in tool blanks and products cut therefrom which exhibit the non-planar bonded surfaces as illustrated at FIGS. 1 and 2.

Various of the compacts made during a polycompact production run exhibit substantially planar interfaces between the abrasive compact layer and the carbide support. Even under such circumstances, finishing and mounting operations may alter such desired planar interface, thus necessitating implementation of the present invention. Other compacts manufactured during a polycompact production run, however, can exhibit interfacial surfaces as illustrated in FIGS. 1 and 2. Finishing and mounting operations sometimes exacerbate the non-planar interfaces of the recovered tool blanks. Regardless of the reason for such non-planar bonded surfaces, it is desired that the products manufactured from such cutting blanks exhibit substantially uniform abrasive compact thickness. For cutting blanks and products that exhibit a configuration as set forth at FIG. 1, the invention is based upon configuring the carbide mass surface of the carbide mass housed within the cup assemblies to have a configuration as illustrated in FIGS. 2 and 3.

Figure 3:
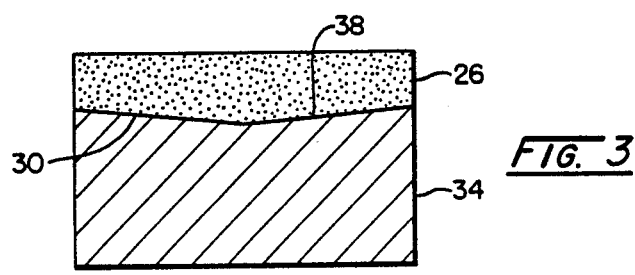
FIGS. 3 and 4 represent the inventive carbide mass mirror image surfaces which are conical in configuration.
Figure 4:
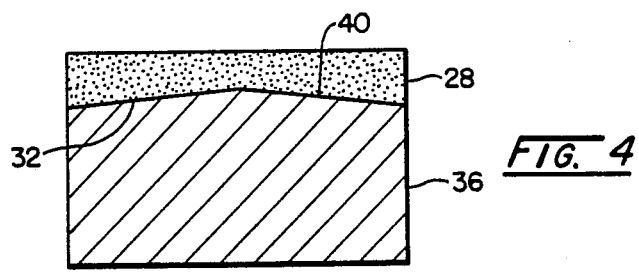

In FIGS. 3 and 4, abrasive particle masses 26 and 28 have surfaces 30 and 32, respectively. Masses 34 and 36 having surfaces 38 and 40 are placed in adjacency with surfaces 30 and 32, to form interfaces 30/38 and 32/40, respectively. Both masses are placed within an enclosure for HP/HT processing. With respect to a blank or product that otherwise would result in a configuration as set forth at FIG. 1, it was noted above that the invention involves configuring the interface to be a mirror image thereof. With respect to FIGS. 1-3, for example, the mirror image of interface 18/20 (FIG. 1) comprises curvilinear interface 22/24 (FIG. 2) or conical interface 30/38 of (FIG. 3). For purposes of the present invention, by "mirror image" is meant that the interface at the carbide mass about a line connecting outer abrasive compact/carbide support interface locations 6 and 8 (FIG. 1) is the mirror image (or near-mirror image) of the abrasive compact interface. Such mirror image configuration for present purposes comprehends the configuration of the diamond surface though not necessarily at a 1:1 magnification. Also, the mirror image carbide surface for present purposes includes curvilinear, conical, and other configurations regardless of the configuration of the abrasive compact surface.

When the resulting blank or product exhibits a non-planar interface as depicted in FIG. 2, then the invention comprises the carbide mass surface mirror image being curvilinear as set forth at FIG. 1 or conical as set forth at FIG. 4. Testing of the present invention revealed the fact that whether the mirror image is conical or curvilinear appears to not significantly affect the desired result of producing compacts having substantially planar interfaces resulting in abrasive layers of substantially uniform thickness, though the curvilinear interface embodiment presently is preferred.

With respect to the amplitude of the mirror image carbide interface, there is not necessarily a 1:1 relationship requiring that the depth of the carbide mass surface be the same as the depth of the abrasive compact surface as measured from the line (or plane) connecting the outer interface edge, but can be smaller or larger depending upon a variety of factors including, for example, the finishing and mounting operations appropriate for the product, the size and distribution of the abrasive particles used in making the abrasive polycrystalline compact, HP/HT processing conditions, etc. It will be appreciated that a certain amount of experimentation or testing must be conducted in order to practice the present invention. That is, the undesirable compacts initially must be manufactured in order to adjudge the degree of non-uniformity of the resulting interface between the abrasive compacts and the carbide support. Also, the processing conditions appropriate for the particular recovered compact must be evaluated in determining that interface configuration. Thereafter, the carbide mirror image surface can be established. Experience will lead the skilled artisan to readily grasp the design of the carbide surface mirror image configuration in order to produce final blanks or products made therefrom that exhibit a substantially uniform abrasive layer thickness and planar interface. Extensive testing has revealed that the invention is quite reproducable at commercial production facilities.

While the thrust of the invention has been described in connection with the desirability of producing finished polycrystalline compacts or parts containing substantially uniform abrasive particle layers, work on the present invention has revealed its flexibility in being able to produce product exhibiting areas where the particle layer thickness has been increased (or decreased) by design. For some abrading operations that rely on polycrystalline compacts, certain areas of the compact tend to experience the brunt of the grinding or abrading action and, consequently, tend to wear out sooner than other areas of the compact. Under these circumstances, it is conceivable that the user of the product may find it advantageous to have such high-wear areas to be manufactured to contain a greater polycrystalline abrasive layer thickness, thus extending the practical useful life of the compact.

The present invention provides the requisite degree of flexibility to be adapted to deliberately produce finished parts containing predetermined areas of predetermined thickness greater (or lesser, if desired) than the other areas of the part. Thus, the finished part with undesirable interface configuration $C_1$ is manufactured to have a desired configuration $C_2$. Under such circumstances, again the invention is based on the recognition that it is the interface configuration of the finished product or part that is to be controlled. The invention permits the user to handle the inventive compacts in substantially the same fashion that they have heretofore been handled, but provide the user with the uniquely pre-configured interfacial parts. It is the manufacturer that is altering the manufacturing process in accordance with the present invention that relieves the user from having to alter its conventional processes to handle the unique parts manufactured by the present invention. This also is important in that when conventional product is being handled by the user, the user's processes need not be altered. Rather, the manufacturer in accordance with the present invention, can provide unique product lines of polycrystalline compacts with uniquely-configured support/abrasive particle layer interfaces that appear in the final product, yet are determined or caused in the manufacturing process.

Figure 5:
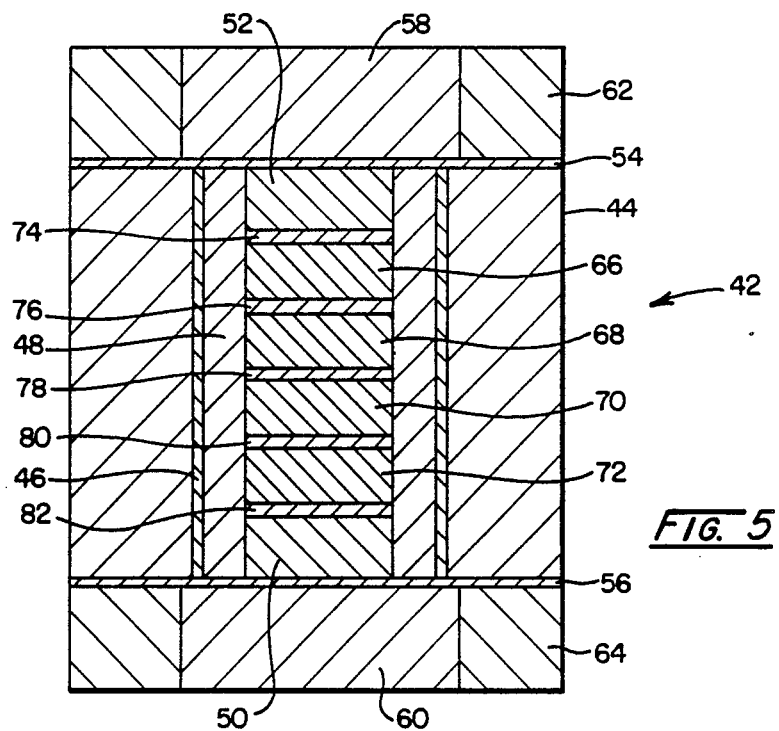
FIG. 5 illustrates an exemplary protective shield metal enclosure for use in an HP/HT apparatus useful in the process of the present invention.

In the manufacture of supported polycrystalline abrasive compacts, an HP/HT apparatus such as described in U.S. Pat. No. 2,941,248, for example, can be utilized. A portion of such apparatus is depicted at FIG. 5. In particular, reaction vessel 42 includes hollow salt cylinder or bushing 44. Cylinder 44 may be manufactured of other material, such as talc, which is not converted during the HP/HT operation to a stronger, stiffer stage and is substantially free of volume discontinuities occurring under the application of HP/HT. Materials meeting the criteria set forth in U.S. Pat. No. 3,030,662 are useful in preparing cylinder 44.

Positioned concentrically within an adjacent cylinder 44 is graphite electrical resistance heater tube 46. Within graphite heater tube 46 is concentrically positioned cylindrical salt liner 48. The ends of liner 48 are fitted with salt plugs 50 and 52, disposed at the bottom and top, respectively. As will be described below, liner 48 may have a cylindrical hollow core to receive one large enclosure containing several cup assemblies. It should be recognized that liner 48 is optional as some HP/HT processes have eliminated this part.

Electrically conductive metal end disks 54 and 56 are utilized at each end of cylinder 44 to provide electrical connection to graphite heater tube 46. Adjacent each disc 54 and 56 is end cap assembly, each of which comprises a phyrophyllite plugs or discs 58 and 60 surrounded by electrical conducting rings 62 and 64.

Housed within reaction vessel 42 are cup assemblies 66–72 which are interleaved and surrounded by shield disc assemblies 74–82. The shield disc assemblies comprise one or more shield discs that can be composed of a refractory metal such as titanium or zirconium, or can be composed of mica disc, alumina disc, salt disc, or combinations thereof.

Figure 6:
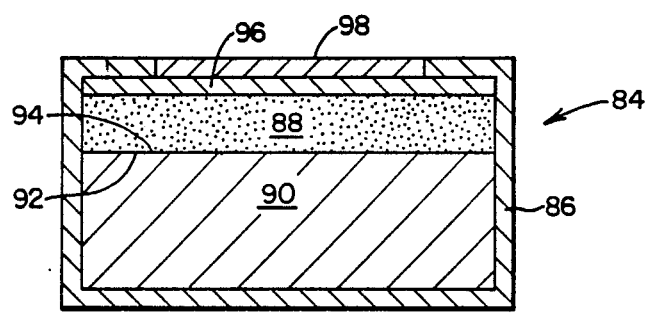
FIG. 6 illustrates a representative cup assembly that is housed within the enclosure depicted at FIG. 5.

Cup assemblies 66–72 are illustrated at FIG. 6. Referring to FIG. 6, cup assembly 84 will be seen to include enclosure 86 of a refractory metal such as molybdenum, tantalum, titanium, tungsten, zirconium, etc. in which is contained mass 88 of diamond particles or CBN particles and mass 90 of cemented metal carbide. Mass 88 has surface 92 and mass 90 has surface 94 which are placed in adjacency within enclosure 86. Refractory metal discs 96 and 98, which may be in greater or lesser number, are positioned at the mouth of enclosure 86 for its sealing. It will be appreciated that the cup assemblies housed within reaction vessel 42 may be greater or lesser in number than that shown. At least one cup assembly is used and often at least two are used for economy and efficiency. Also, the orientation of cup assembly 84 may be like that depicted at FIG. 6 or can be upside down therefrom for placing within reaction vessel 42. In fact, alternating the orientation of cup assembly 84 is a known technique in the art.

The crystallite size of the diamond or CBN can range from submicron size on up to 100 microns or greater, the size gradient distribution being practiced as is necessary or desirable. The present invention, though, has greater applicability when fine crystallite size particles are being used, e.g. 2–8 microns or less. The bowing effect noted to be a problem in the art tends to be less severe when using larger crystallite sizes, though still is present. With respect to the catalyst/sintering aid, desirably this material is contained within the cemented metal carbide and infiltrates therefrom through the mass of crystals. Alternatively, the catalyst/sintering agent may be admixed with the mass of abrasive particles or can be a separate layer placed adjacent mass of diamond particles or interposed between the mass of diamond particles and mass of cemented metal carbide, all such techniques having been disclosed in the art.

The following examples show how the present invention has been practiced, but should not be construed as limiting. In this application, all percentages and proportions are by weight unless otherwise expressly indicated. Also, all citations referred to herein are expressly incorporated herein by reference.

EXAMPLES

Example 1

This is a comparative example illustrating the interfacial bowing that results in the production of supported polycrystalline diamond compacts. The compacts made utilized diamond crystals of about 6 microns average particle size and cobalt cemented tungsten carbide for the support. The cylindrical compacts were about 34 mm in diameter and the diamond layer thickness specification was about 0.4 mm minimum. The overall diamond layer/carbide support thickness specification was about 1.5 or 3.2 mm. Four cup assemblies were housed within the HP/HT apparatus as previously described with processing conditions including a temperature of about 1450° C. and a pressure of about 50 Kbars being applied for about 20 minutes. The cup assemblies recovered from the shield metal enclosure were ground to remove any adhering metal and cut in half in order to inspect and measure the amount of bowing, or were subjected to scanning acoustical microscopy. Blanks 1 and 4 were the outer blanks formed while blanks 2 and 3 were the inner blanks formed. The results as typically obtained are set forth at FIG. 7.

Figure 7:
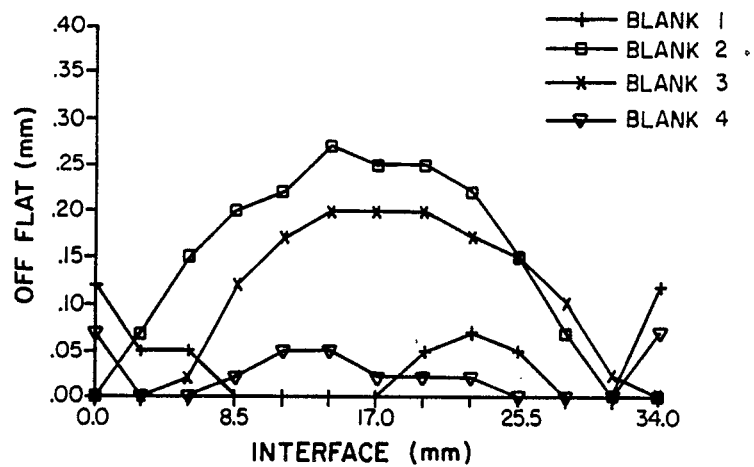
FIG. 7 diagrammatically represents the non-planar bonded surfaces of tungsten carbide supported polycrystalline diamond compacts made without benefit of the present invention.

With respect to FIG. 7, the distance from planar of the diamond surface at the interface is plotted over the diameter of the cutting blanks manufactured. It will be observed that blanks 1 and 4 tend to exhibit a substantially uniform interface, while blanks 2 and 3 are substantially bowed in the center as illustrated at FIG. 1. The variation of diamond table thickness is desired to be ±0.004 inch (about 0.1016 mm).

It should be appreciated, that even blanks 1 and 2 of FIG. 7 may exhibit bowing later depending upon finishing and mounting conditions to which the product will be exposed, e.g. brazing. Even though the product as manufactured is within specification, such later processing operations may result in a product that is bowed to such an extent that it is out of specification, thus necessitating implementation of the precepts of the present invention.

EXAMPLE 2

This example illustrates the present invention. The procedure was repeated as described in connection with Example 1. The center of the carbide mass where the mirror image depression was at its greatest was about 0.010 inch (about 0.254 mm). From this center point, the "A" cutting blanks were configured with a straight line angle thus forming a conical surface as illustrated at FIG. 3. The "R" cutting blanks exhibited a radius of curvature for providing a curvilinear carbide surface as illustrated at FIG. 2. The results for different runs are set forth at FIGS. 8 and 9.

Figure 8:
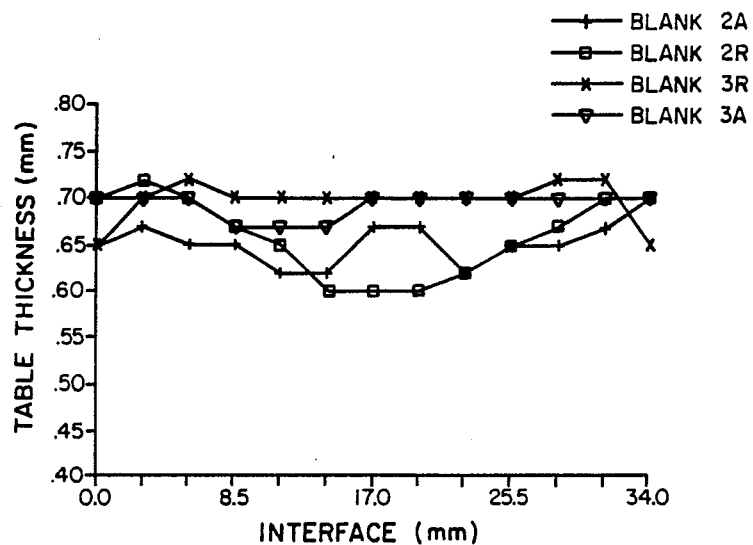
FIG. 8 represents the diamond compact thickness of the two inner of four polycrystalline diamond cutting blanks made in accordance with the process of the present invention utilizing a curvilinear carbide mass surface and a conical carbide mass surface.

With reference to FIG. 8, only the two inner blanks were measured since they were the blanks that tended to have the greatest bowing or distortion as illustrated in FIG. 1. FIG. 9 plots the diamond table thickness (in mm) over the diameter of the cutting blanks. It will be observed that all of the cutting blanks exhibited a thickness of at least 0.4 mm, the desired specification. While some difference between the conical and curvilinear configurations are noted, they are not believed to be significant, as additional testing has revealed.

The results of this example have been repeated hundreds of times with the same consistency as reported herein. The consistency of results makes the invention especially valuable for commercial scale operations.

I claim:

1. In a method for making a supported polycrystalline diamond (PCD) or cubic boron nitride (CBN) compact comprising:
   placing in an enclosure a cup assembly having a mass of diamond or CBN particles having a surface, a mass of cemented metal carbide having a surface, and for diamond particles optionally a catalyst for diamond recrystallization, said surfaces being in adjacency for forming an interface;
   subjecting said enclosure to a HP/HT process which results in a compact bonded to a cemented carbide support at said interface;
   recovering said supported compact from said enclosure and said cup assembly; and
   finishing said supported compact, said finished supported compact, exhibiting a non-planar interface resulting in a PCD or CBN compact of substantially non-uniform thickness,
   the improvement which comprises said carbide mass surface placed in said assembly being the mirror image of said finished PCD or CBN non-planar interface for making a finished supported compact of substantially uniform compact thickness.

2. The method of claim 1 wherein at least two of said cup assemblies are placed inside said enclosure.

3. The method of claim 1 wherein said supported compact comprises a supported polycrystalline diamond compact.

4. The method of claim 1 wherein said supported compact comprises a supported cubic boron nitride compact.

5. The method of claim 1 wherein said metal of said cemented metal carbide is selected from the group consisting of tungsten, titanium, tantalum, or mixtures thereof.

6. The method of claim 5 wherein said cemented metal carbide is cemented with a metal selected from the group consisting of cobalt, nickel, iron, or mixtures thereof.

7. The method of claim 1 wherein said HP/HT process includes a pressure of greater than about 50 Kbars and a temperature of greater than about 1300° C.

8. The method of claim 1 wherein said catalyst for diamond recrystallization is selected from the group consisting of cobalt, nickel, iron, ruthenium, rhodium, palladium, platinum, chromium, manganese, tantalum, or mixtures or alloys thereof.

9. The method of claim 1 wherein said diamond or CBN particles range in size up to about 1,000 microns.

10. The method of claim 9 wherein said particles range in particle size up to about 8 microns.

11. The method of claim 1 wherein said supported PCD or CBN compacts are cylindrical.

12. The method of claim 1 wherein said mirror image carbide mass surface is curvilinear or conical in shape.

13. In a method for manufacturing a polycrystalline diamond (PCB) or cubic boron nitride (CBN) compact bonded to a cemented metal carbide support at an interface therebetween in a process comprising the steps of:
   (a) placing within an enclosure a cup assembly having a mass of diamond or CBN particles having a surface, a mass of cemented metal carbide having a surface, and optionally a catalyst for diamond recrystallization, said surfaces being in adjacency for forming said interface;
   (b) subjecting said enclosure to an HP/HT process which results in a PCD or CBN compact bonded to said cemented carbide support at said interface;
   (c) recovering said supported compact from said enclosure and said cup assembly; and
   (d) finishing said supported compact, said interface having a configuration $C_1$, the improvement in process for manufacturing a finished supported compact having an interface of configuration $C_2$, wherein $C_1$ and $C_2$ are different, which comprises:
   placing in said assembly said mass of particles and said mass of cemented metal carbide having an interface therebetween of such configuration that the recovered finished supported compact exhibits an interface having the configuration $C_2$.

14. The method of claim 13 wherein at lest two of said cup assemblies are placed inside said enclosure.

15. The method of claim 13 wherein said supported compact comprises a supported polycrystalline diamond compact.

16. The method of claim 13 wherein said supported compact comprises a supported cubic boron nitride compact.

17. The method of claim 13 wherein said metal of said cemented metal carbide is selected from the group consisting of tungsten, titanium, tantalum, or mixtures thereof.

18. The method of claim 17 wherein said cemented metal carbide is cemented with a metal selected from the group consisting of cobalt, nickel, iron, or mixtures thereof.

19. The method of claim 13 wherein said HP/HT process includes a pressure of greater than about 50 Kbars and a temperature of greater than about 1300° C.

20. The method of claim 13 wherein said catalyst for diamond recrystallization is selected from the group consisting of cobalt, nickel, iron, ruthenium, rhodium, palladium, platinum, chromium, manganese, tantalum, or mixtures or alloys thereof.

21. The method of claim 13 wherein said diamond or CBN particles range in size up to about 1,000 microns.

22. The method of claim 21 wherein said particles range in particle size up to about 8 microns.

23. The method of claim 13 wheren said supported PCD or CBN compacts are cylindrical.

* * * * *